(12) United States Patent
Thaker et al.

(10) Patent No.: US 10,154,312 B2
(45) Date of Patent: Dec. 11, 2018

(54) SYSTEMS AND METHODS FOR RANKING AND PROVIDING RELATED MEDIA CONTENT BASED ON SIGNALS

(71) Applicant: Facebook, Inc., Menlo Park, CA (US)

(72) Inventors: Sahil P. Thaker, San Jose, CA (US); Uzma Hussain Barlaskar, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/150,345

(22) Filed: May 9, 2016

(65) Prior Publication Data

US 2017/0324996 A1   Nov. 9, 2017

(51) Int. Cl.
| | |
|---|---|
| *H04N 21/466* | (2011.01) |
| *H04N 21/45* | (2011.01) |
| *H04N 21/442* | (2011.01) |
| *H04N 21/25* | (2011.01) |
| *H04N 21/258* | (2011.01) |
| *H04N 21/2668* | (2011.01) |

(52) U.S. Cl.
CPC ....... *H04N 21/4668* (2013.01); *H04N 21/252* (2013.01); *H04N 21/25883* (2013.01); *H04N 21/25891* (2013.01); *H04N 21/2668* (2013.01); *H04N 21/44222* (2013.01); *H04N 21/4532* (2013.01); *H04N 21/4662* (2013.01)

(58) Field of Classification Search
CPC ........... H04N 21/2668; H04N 21/4668; H04N 21/252; H04N 21/25883; H04N 21/25891; H04N 21/44222; H04N 21/4532
See application file for complete search history.

(56) References Cited

U.S. PATENT DOCUMENTS

| | | | |
|---|---|---|---|
| 5,790,935 A | * 8/1998 | Payton | H04N 7/17336 348/E7.073 |
| 6,177,931 B1 | * 1/2001 | Alexander | G06Q 30/0269 348/565 |
| 2015/0012926 A1 | * 1/2015 | Wei | H04N 21/26258 725/9 |
| 2016/0323619 A1 | * 11/2016 | Lewis | H04N 21/2668 |

* cited by examiner

*Primary Examiner* — Hunter B Lonsberry
(74) *Attorney, Agent, or Firm* — Sheppard Mullin Richter & Hampton LLP

(57) ABSTRACT

Systems, methods, and non-transitory computer-readable media can detect a trigger to generate a set of media content items associated with at least one of a particular media content item or a user viewing the particular media content item. A plurality of content generators can be utilized to generate a plurality of subsets of media content items. Each of the plurality of content generators can identify a respective subset out of the plurality of subsets of media content items based on at least one of information associated with the particular media content item or information associated with the user viewing the particular media content item. At least some media content items in at least some of the plurality of subsets of media content items can be ranked based on respective information associated with each media content item.

17 Claims, 9 Drawing Sheets

SYSTEMS AND METHODS FOR RANKING AND PROVIDING RELATED MEDIA CONTENT BASED ON SIGNALS

FIELD OF THE INVENTION

The present technology relates to the field of multimedia processing. More particularly, the present technology relates to techniques for ranking and providing related media content based on signals.

BACKGROUND

Today, people often utilize computing devices (or systems) for a wide variety of purposes. Users can use their computing devices to, for example, interact with one another, access content, share content, and create content. In some cases, users can utilize their computing devices to generate, download, view, access, or otherwise interact with multimedia or media content, such as images, videos, audio, and text. For example, users of a social networking system (or service) can load, stream, access, and/or share video content items by utilizing their computing devices.

In some instances, users can access, view, upload, and/or share various video content items (i.e., videos), such as via a media sharing online resource. For example, the media sharing online resource can be included with the social networking system. However, conventional approaches specifically arising in the realm of computer technology can, in some cases, require users to browse and search for content manually. This can be uninteresting, inconvenient, or inefficient. Manual searching or browsing through content can be tedious. When the potential sources of relevant content are large, as is often true with some social networking systems, efforts to conduct comprehensive, organized searching may be complicated and daunting. Further, the expenditure of such effort can result in the identification of content that is still less relevant than optimal. Accordingly, conventional approaches can create challenges for or reduce the overall experience associated with utilizing, accessing, or interacting with media content such as videos.

SUMMARY

Various embodiments of the present disclosure can include systems, methods, and non-transitory computer readable media configured to detect a trigger to generate a set of media content items associated with at least one of a particular media content item or a user viewing the particular media content item. A plurality of content generators can be utilized to generate a plurality of subsets of media content items. Each of the plurality of content generators can identify a respective subset out of the plurality of subsets of media content items based on at least one of information associated with the particular media content item or information associated with the user viewing the particular media content item. At least some media content items in at least some of the plurality of subsets of media content items can be ranked based on respective information associated with each media content item. One or more media content items that satisfy specified ranking criteria can be selected from at least some of the plurality of subsets of media content items. The one or more media content items can be selected to be included in the set of media content items.

In an embodiment, a predictive model configured to facilitate ranking the at least some media content items can be developed.

In an embodiment, developing the predictive model can further comprise acquiring media channel data associated with the particular media content item. A set of one or more signals can be generated based on the media channel data. The predictive model can be trained using at least a subset of the set one or more signals.

In an embodiment, ranking the at least some media content items can further comprise predicting, based on the predictive model, one or more respective events for each of the at least some media content items. The one or more respective events for each of the at least some media content items can be combined to produce a respective event metric for each of the at least some media content items. The at least some media content items can be sorted based on the respective event metric for each of the at least some media content items.

In an embodiment, the one or more respective events for each of the at least some media content items can include at least one of a like event, a share event, a comment event, or a view duration event.

In an embodiment, the plurality of content generators can include at least one of a behavioral similarity generator, a content similarity generator, a crowd sourcing generator, a same source generator, a user targeting generator, or a trending topic generator.

In an embodiment, the behavioral similarity generator can utilize collaborative filtering to identify a particular subset of media content items included in the plurality of subsets of media content items. The collaborative filtering can be based on at least one of a like signal, a share signal, a comment signal, a view duration signal, or a mention signal.

In an embodiment, the content similarity generator can identify a particular subset of media content items included in the plurality of subsets of media content items. The particular subset of media content items can be identified by the content similarity generator based on at least one of a mention signal, a text signal, a tag signal, a topic classification signal, or an image classification signal.

In an embodiment, the user targeting generator can identify a particular subset of media content items included in the plurality of subsets of media content items. The particular subset of media content items can be identified by the user targeting generator based on the information associated with the user. The information associated with the user can include at least one of user usage pattern data, user viewing history data, or user demographic data.

In an embodiment, the set of media content items can include a set of one or more videos. The particular media content item can include a particular video within a particular video channel.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
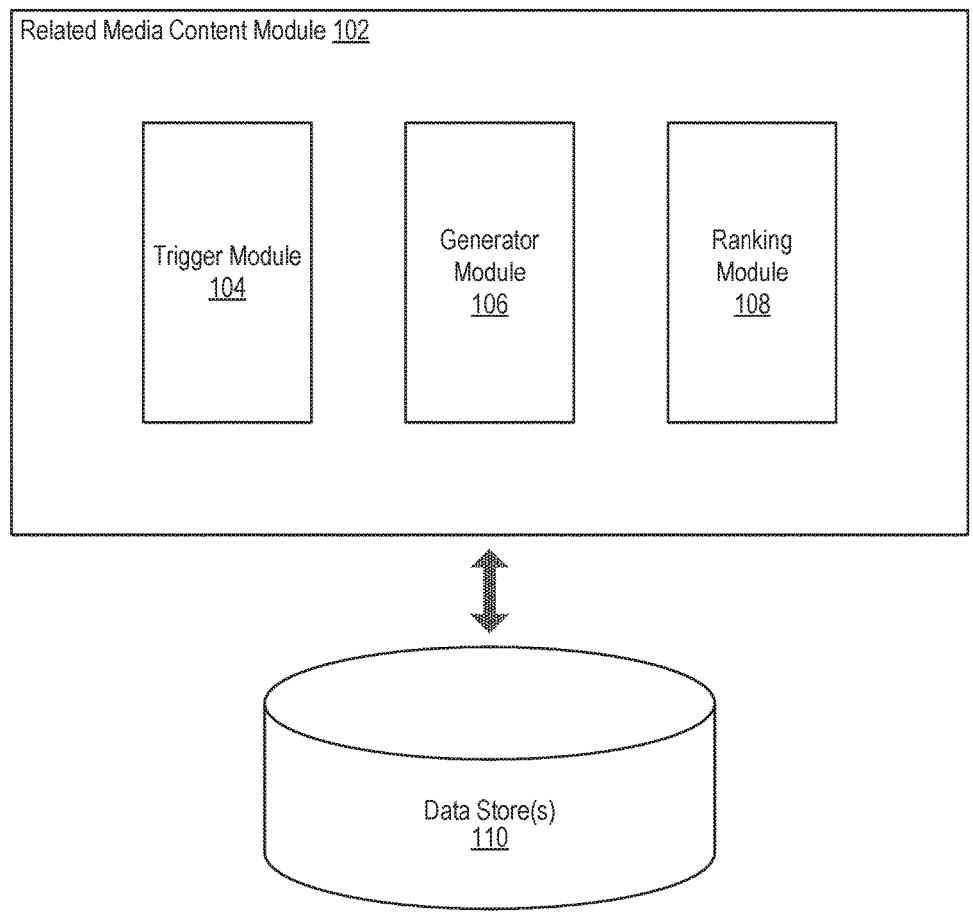
FIG. 1 illustrates an example system including an example related media content module configured to facilitate ranking and providing related media content based on signals, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein. It should be understood that all examples herein are provided for illustrative purposes and that there can be many variations or other possibilities associated with the disclosed technology.

DETAILED DESCRIPTION

Ranking and Providing Related Media Content Based on Signals

People use computing systems (or devices) for various purposes. Users can utilize their computing systems to establish connections, engage in communications, interact with one another, and/or interact with various types of content. In some cases, computing devices can include or correspond to cameras capable of capturing or recording media content, such as images or videos (including sets of video image frames or still frames). In some instances, computing devices can be utilized by users to view, edit, upload, post, and/or share media content items such as videos. For example, users can access a media sharing online resource via their computing devices in order to watch, provide, share, and/or otherwise interact with video content. In this example, the media sharing online resource can be provided by or included with a social networking system (or service).

In many cases, conventional approaches specifically arising in the realm of computer technology for processing videos can initially present or grant access to a media content item, such as a video, that a user has selected or chosen to view. After the user accesses or views this initial media content item, the user may desire to access or view additional media content items. However, manually searching or browsing through media content to identify additional media content items, in accordance with conventional approaches, can be inefficient or inconvenient. In some instances, under conventional approaches, one or more additional media content items identified by the user via manual effort may be uninteresting, irrelevant, or unrelated to the initial media content item. Accordingly, conventional approaches can create challenges for or reduce the overall experience associated with utilizing, accessing, or interacting with media content such as videos.

Due to these or other concerns, conventional approaches specifically arising in the realm of computer technology can be disadvantageous or problematic. Therefore, an improved approach rooted in computer technology that overcomes the foregoing and other disadvantages associated with conventional approaches can be beneficial. Based on computer technology, the disclosed technology can rank and provide related media content based on signals. Various embodiments of the disclosed technology can detect a trigger to generate a set of media content items associated with at least one of a particular media content item or a user viewing the particular media content item. A plurality of content generators can be utilized to generate a plurality of subsets of media content items. Each of the plurality of content generators can identify a respective subset out of the plurality of subsets of media content items based on at least one of information associated with the particular media content item or information associated with the user viewing the particular media content item. At least some media content items in at least some of the plurality of subsets of media content items can be ranked based on respective information associated with each media content item. One or more media content items that satisfy specified ranking criteria can be selected from at least some of the plurality of subsets of media content items. The one or more media content items can be selected to be included in the set of media content items. It is contemplated that there can be many variations and/or other possibilities associated with the disclosed technology.

FIG. 1 illustrates an example system 100 including an example related media content module 102 configured to facilitate ranking and providing related media content based on signals, according to an embodiment of the present disclosure. As shown in the example of FIG. 1, the related media content module 102 can include a trigger module 104, a generator module 106, and a ranking module 108. In some instances, the example system 100 can include at least one data store 110. The components (e.g., modules, elements, etc.) shown in this figure and all figures herein are exemplary only, and other implementations may include additional, fewer, integrated, or different components. Some components may not be shown so as not to obscure relevant details.

In some embodiments, the related media content module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the related media content module 102 can be implemented, in part or in whole, as software running on one or more computing devices or systems, such as on a user or client computing device. For example, the related media content module 102 or at least a portion thereof can be implemented as or within an application (e.g., app), a program, an applet, or an operating system, etc., running on a user computing device or a client computing system, such as the user device 610 of FIG. 6. In another example, the related media content module 102 or at least a portion thereof can be implemented using one or more computing devices or systems which can include one or more servers, such as network servers or cloud servers. In some instances, the related media content module 102 can, in part or in whole, be implemented within or configured to operate in conjunction with a social networking system (or service), such as the social networking system 630 of FIG. 6. It should be appreciated that there can be many variations or other possibilities.

The trigger module 104 can be configured to facilitate detecting a trigger to generate a set of media content items associated with at least one of a particular media content item or a user viewing the particular media content item. In some instances, the set of media content items can include a set of one or more videos, and the particular media content item can include a particular video within a particular video channel. For example, a user of a social networking system can attempt to view or access a particular media content item, such as a particular video provided via the social networking system. In this example, the disclosed technology can attempt to provide one or more additional videos that are related to the particular video and/or that are relevant to the user (i.e., that have been determined to each possess at least a specified minimum threshold likelihood/confidence of being relevant to the user). As such, in some cases, the particular video can be referred to as a parent video, a source video, an original video, and/or an initial video, etc., and the one or more additional video can stem from the particular video.

In some embodiments, the trigger module 104 can detect an instruction or command from the user as the trigger to generate the set of media content items, such as the one or more additional videos. For instance, the trigger can correspond to a click, tap, and/or press of an interface element (e.g., button, key, etc.) by the user to access or view the particular media content item. In this instance, the instruction or command from the user can result in a playback of the particular media content item.

In some implementations, the trigger module 104 can detect the completion of a playback of the particular media content item as the trigger to generate the set of media content items. For example, when a particular video has finished playing, the trigger module 104 can detect, as the trigger, a finished state associated with the playing of the particular video. Then the disclosed technology can present the one or more additional videos to the user. It is contemplated that there can be many variations or other possibilities associated with the disclosed technology.

Moreover, the generator module 106 can be configured to facilitate utilizing a plurality of content generators to generate, determine, recognize, or identify, etc., a plurality of subsets of media content items. Each of the plurality of content generators identifies (i.e., generates, determines, etc.) a respective subset out of the plurality of subsets of media content items based on at least one of information associated with the particular media content item or information associated with the user viewing the particular media content item. More details regarding the generator module 106 will be provided below with reference to FIG. 2A.

Furthermore, the ranking module 108 can be configured to facilitate ranking, based on respective information associated with each media content item, at least some media content items in at least some of the plurality of subsets of media content items. The ranking module 108 can also be configured to select one or more media content items, from at least some of the plurality of subsets of media content items, that satisfy specified ranking criteria. The one or more media content items can be selected to be included in the set of media content items. The ranking module 108 will be discussed in more detail below with reference to FIG. 2B.

Additionally, in some embodiments, the related media content module 102 can be configured to communicate and/or operate with the at least one data store 110, as shown in the example system 100. The at least one data store 110 can be configured to store and maintain various types of data. In some implementations, the at least one data store 110 can store information associated with the social networking system (e.g., the social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 110 can store information associated with users, such as user identifiers, user information, profile information, user locations, user specified settings, content produced or posted by users, and various other types of user data. In some embodiments, the at least one data store 110 can store information that is utilized by the related media content module 102. Again, it is contemplated that there can be many variations or other possibilities associated with the disclosed technology.

Figure 2A:
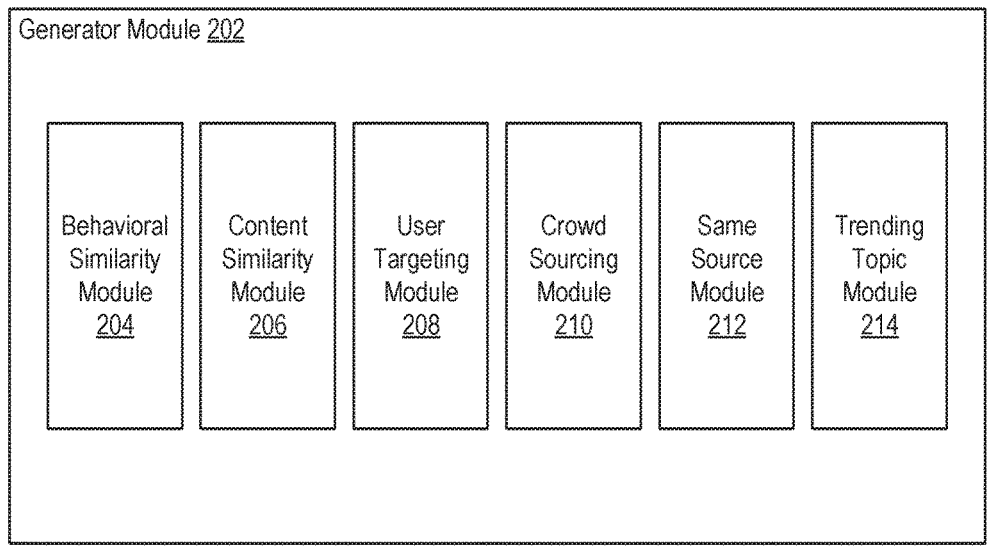
FIG. 2A illustrates an example generator module configured to facilitate ranking and providing related media content based on signals, according to an embodiment of the present disclosure.

FIG. 2A illustrates an example generator module 202 configured to facilitate ranking and providing related media content based on signals, according to an embodiment of the present disclosure. In some embodiments, the generator module 106 of FIG. 1 can be implemented as the example generator module 202. As shown in FIG. 2A, the generator module 202 can include a behavioral similarity module 204, a content similarity module 206, a user targeting module 208, a crowd sourcing module 210, a same source module 212, and a trending topic module 214. Again, the components (e.g., modules, elements, etc.) shown in this figure and all figures herein are exemplary only, and other implementations may include additional, fewer, integrated, or different components. Some components may not be shown so as not to obscure relevant details.

As discussed previously, the generator module 202 can be configured to facilitate utilizing a plurality of content generators to generate (i.e., identify, determine, etc.) a plurality of subsets of media content items. In some embodiments, the plurality of subsets of media content items can form or can be included in a set of media content items associated with at least one of a particular media content item or a user viewing the particular media content item. In some cases, the generator module 202 can cause each of the plurality of content generators to identify a respective subset out of the plurality of subsets of media content items based on at least one of information associated with the particular media content item or information associated with the user viewing the particular media content item. For instance, the plurality of content generators can generate or identify videos related to a particular video based on metadata for the particular video. The plurality of content generators can also generate or identify videos targeted toward a particular user viewing the particular video based on data (e.g., usage data, demographic data, social engagement data, etc.) about the particular user. In this instance, each of the content generators can generate or identify a respective subset of videos using a different approach. At least some of the respective subsets of videos can form or can be included in a set of videos (e.g., related and/or targeted videos) provided to the particular user, such as when the particular user is finished with viewing the particular video.

In some implementations, the plurality of content generators can include at least one of a behavioral similarity generator, a content similarity generator, a crowd sourcing generator, a same source generator, a user targeting generator, or a trending topic generator, etc. The behavioral similarity (or interactivity similarity, engagement similarity, etc.) generator can be implemented, can run, and/or can operate via the behavioral similarity module 204. The behavioral similarity generator can, for example, utilize collaborative filtering (e.g., via matrix factorization) to identify a particular subset of media content items included in the plurality of subsets of media content items. In some cases, the collaborative filtering can be based on at least one of a like signal, a share signal, a comment signal, a view duration (e.g., view percentage/amount) signal, or a mention (e.g., @ mention) signal, etc. In one example, the behavioral similarity generator can generate or identify videos related to the particular (source) video based on applying collaborative filtering to the above-mentioned or other signals. The behavioral similarity module 204 can enable the behavioral similarity generator to generate or identify videos with which users have interacted or engaged in a similar manner as with the particular video. Accordingly, a video that is engaged with or viewed by certain users who also engage with or view the particular video can be determined, by the behavioral similarity generator, to be related to the particular video. Moreover, a video that is engaged with or viewed by users similar to the particular user can be determined, by the behavioral similarity generator, to be related to the particular user and/or to the particular video. It is contemplated that there can be many variations or other possibilities associated with the disclosed technology.

In some embodiments, the content similarity generator can be implemented, can run, and/or can operate via the content similarity module 206. The content similarity generator can generate or identify a particular subset of media content items included in the plurality of subsets of media content items. The particular subset of media content items can be identified by the content similarity generator based on at least one of a mention signal, a text signal, a tag signal, a topic classification signal, or an image classification signal. In one example, the content similarity module 206 can enable the content similarity generator to generate or identify videos that are similar to (e.g., videos that include content that is similar to) the particular video. For instance, the content similarity module 206 can cause the content similarity generator to analyze metadata (e.g., similar topics/pages, similar tags, similar image classifications, similar mentions, similar text/n-grams, etc.) for the particular video and for other videos in order to determine their content similarity. Many variations associated with the disclosed technology are possible.

In some implementations, the user targeting generator can be implemented, can run, and/or can operate via the user targeting module 208. The user targeting generator can generate or identify a particular subset of media content items included in the plurality of subsets of media content items. The particular subset of media content items can be identified by the user targeting generator based on the information associated with the user. The information associated with the user can include at least one of user usage pattern data, user viewing history data, or user demographic data. It should be appreciated that there can be many variations or other possibilities.

In some embodiments, the crowd sourcing module 210, the same source module 212, and the trending topic module 214 can respectively implement, run, and/or operate the crowd sourcing generator, the same source generator, and the trending topic generator. Based on crowd sourcing data (e.g., comment data), the crowd sourcing generator can generate or identify videos that are related to the particular video and/or that are targeted at the user viewing the particular video. Moreover, based on source data (e.g., author data, publisher data, poster data, and/or sharer data, etc.), the same source generator can generate or identify videos that are related to the particular video and/or that are targeted at the user viewing the particular video. In this regard, the same source generator can generate or identify videos authored, published, posted, shared, or otherwise provided by a same or common entity. Furthermore, based on trending topic data, the trending topic generator can generate or identify videos (e.g., trending videos) to be presented to the user. Again, it should be understood that many variations associated with the disclosed technology are possible.

Figure 2B:
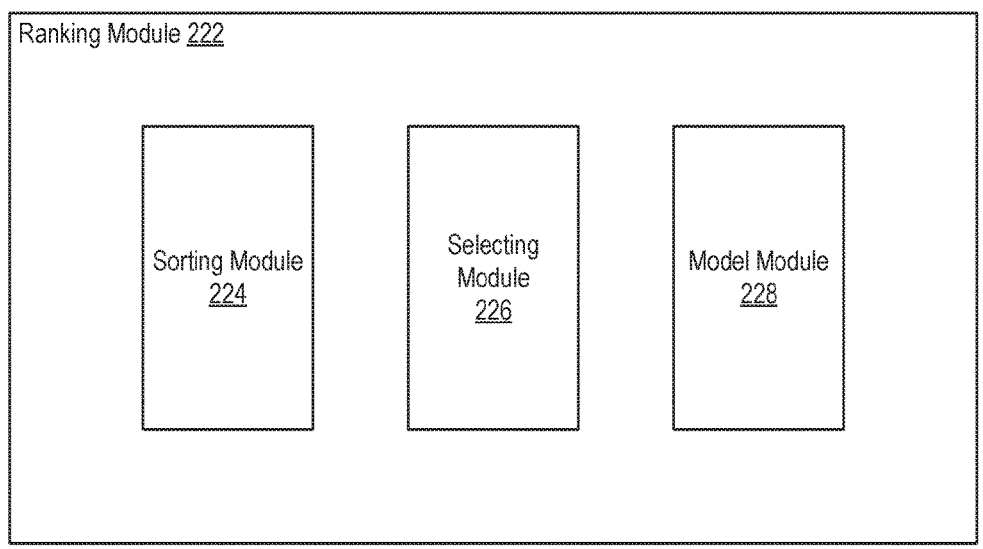
FIG. 2B illustrates an example ranking module configured to facilitate ranking and providing related media content based on signals, according to an embodiment of the present disclosure.

FIG. 2B illustrates an example ranking module 222 configured to facilitate ranking and providing related media content based on signals, according to an embodiment of the present disclosure. In some embodiments, the ranking module 108 of FIG. 1 can be implemented as the example ranking module 222. As shown in FIG. 2B, the ranking module 222 can include a sorting module 224, a selecting module 226, and a model module 228.

As discussed previously, the ranking module 222 can be configured to facilitate ranking, based on respective information associated with each media content item, at least some media content items in at least some of a plurality of subsets of media content items. In some embodiments, the ranking module 222 can acquire, determine, and/or calculate, etc., the respective information associated with each media content item. The ranking module 222 can utilize the sorting module 224 to rank, sort, and/or order, etc., at least some media content items in at least some of the plurality of subsets of media content items. In some cases, the at least some media content items can be ranked, sorted, and/or ordered, etc., by the sorting module 224, based on a respective relevancy metric (e.g., a respective relevancy likelihood or confidence score) determined for each media content item.

Moreover, the ranking module 222 can be configured to facilitate selecting one or more media content items, from at least some of the plurality of subsets of media content items, that satisfy specified ranking criteria, as discussed above. The one or more media content items can be selected to be included in the set of media content items. In some implementations, the ranking module 222 can utilize the selecting module 226 to select the one or more media content items that satisfy the specified ranking criteria. For example, the specified ranking criteria can cause the selecting module 226 to select a specified quantity of highest ranked media content items. In another example, the specified ranking criteria can cause the selecting module 226 to select media content items that each have at least a specified minimum threshold relevancy metric (e.g., confidence score, likelihood metric, etc.) of being related or relevant to a particular (source) video and/or a user viewing the particular video. Many variations are possible.

Furthermore, the ranking module 222 can utilize the model module 228 to develop a predictive model configured to facilitate ranking the at least some media content items. In some embodiments, the model module 228 can acquire media channel data associated with the particular media content item, such as by acquiring video channel data associated with a particular video. The model module 228 can cause a set of one or more signals to be generated based on the media channel data. The model module 228 can further train the predictive model using at least a subset of the set one or more signals.

In some implementations, ranking the at least some media content items can further comprise predicting, based on the predictive model, one or more respective events for each of the at least some media content items. The one or more respective events for each of the at least some media content items can be combined (and/or weighted) to produce a respective event metric (e.g., score) for each of the at least some media content items. The at least some media content items can be sorted, ordered, and/or ranked, etc., based on the respective event metric for each of the at least some media content items. In some cases, the one or more respective events for each of the at least some media content items can include at least one of a like event, a share event, a comment event, or a view duration (e.g., view percentage/amount) event, etc. As discussed previously, it is contemplated that there can be many variations or other possibilities associated with the disclosed technology. For example, in some embodiments, media content items, such as videos, can be associated with metadata. In this regard, such metadata can include tags or other types of descriptors or references. The metadata can be used to rank or categorize media content items within a channel (e.g., video channel).

Figure 3A:
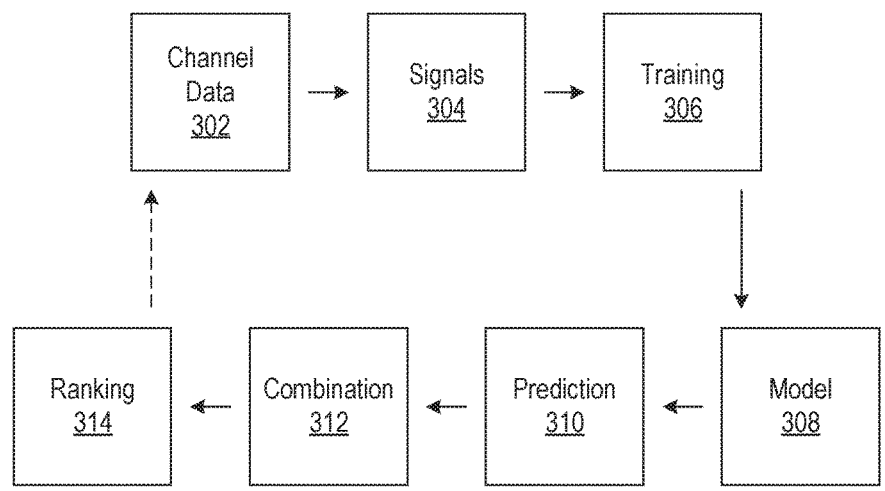
FIG. 3A illustrates an example scenario associated with ranking and providing related media content based on signals, according to an embodiment of the present disclosure.

FIG. 3A illustrates an example scenario 300 associated with ranking and providing related media content based on signals, according to an embodiment of the present disclosure. As shown in the example scenario 300 of FIG. 3A, media channel data (e.g., video channel data, user behavioral patterns, user usage data, etc.) can be acquired, at block 302. Signals (e.g., likes, comments, shares, view durations/amounts, etc.) can be determined, calculated, generated, and/or otherwise acquired based on the media channel data, at block 304. The signals can be utilized for training, such as based on machine learning, at block 306. The training can produce a predictive model, at block 308. Moreover, the predictive model can be utilized to produce one or more predictions, such as predicted events, at block 310. At least some of the one or more predictions can be combined, weighted, and/or aggregated, etc., at block 312. Based on combining at least some of the predictions, media ranking can be performed, at block 314. In some instances, ranked media content can be utilized for acquiring media channel data. Again, many variations are possible.

Figure 3B:
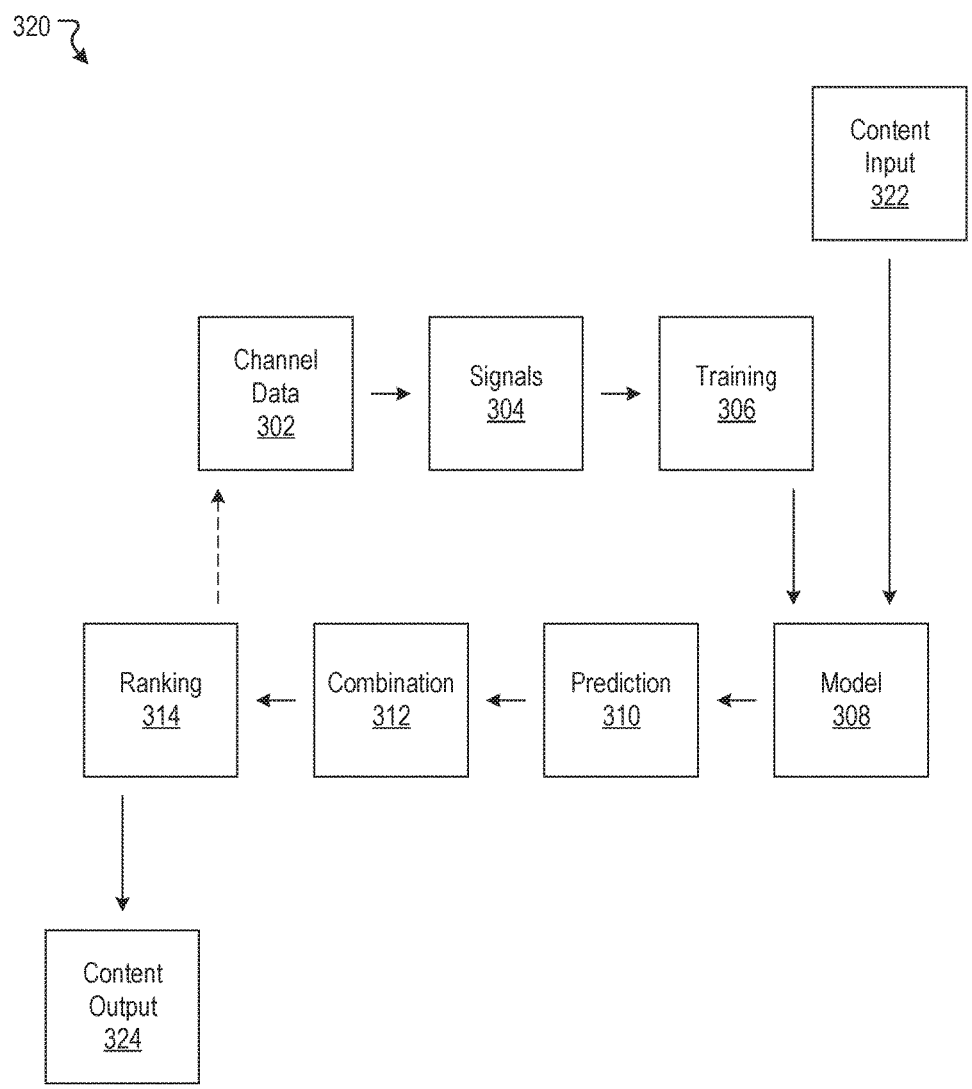
FIG. 3B illustrates an example scenario associated with ranking and providing related media content based on signals, according to an embodiment of the present disclosure.

FIG. 3B illustrates an example scenario 320 associated with ranking and providing related media content based on signals, according to an embodiment of the present disclosure. The example scenario 320 of FIG. 3B can be similar to the example scenario 300 of FIG. 3A. As shown in the example scenario 320 of FIG. 3B, content can be inputted, at block 322, into the predictive model. In some cases, videos can be inputted into the trained predictive model in order to predict events (e.g., to predict the likelihoods of likes, shares, comments, etc.) that may occur with respect to the videos. Based on the predicted events for the videos, the videos can be ranked. Certain highly ranked videos can then be selected as output content, at block 324. Such outputted content can be presented, to a user viewing a particular video, as videos related to the particular video and/or to the user. As discussed above, there can be many variations or other possibilities associated with the disclosed technology.

Figure 4:
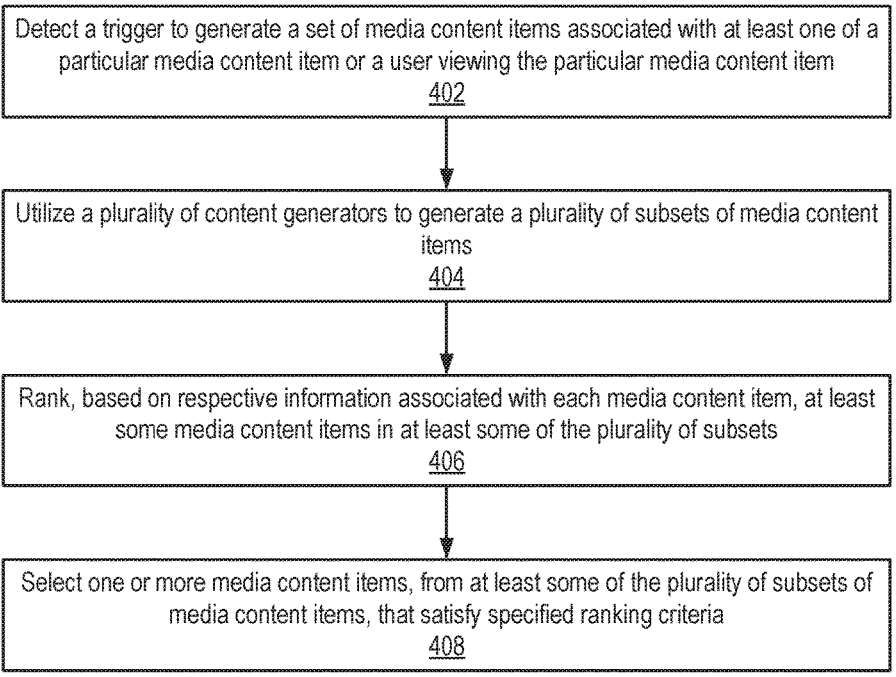
FIG. 4 illustrates an example method associated with ranking and providing related media content based on signals, according to an embodiment of the present disclosure.

FIG. 4 illustrates an example method 400 associated with ranking and providing related media content based on signals, according to an embodiment of the present disclosure. It should be appreciated that there can be additional, fewer, or alternative steps performed in similar or alternative orders, or in parallel, within the scope of the various embodiments unless otherwise stated.

At block 402, the example method 400 can detect a trigger to generate a set of media content items associated with at least one of a particular media content item or a user viewing the particular media content item. At block 404, the example method 400 can utilize a plurality of content generators to generate a plurality of subsets of media content items. Each of the plurality of content generators can identify a respective subset out of the plurality of subsets of media content items based on at least one of information associated with the particular media content item or information associated with the user viewing the particular media content item. At block 406, the example method 400 can rank, based on respective information associated with each media content item, at least some media content items in at least some of the plurality of subsets of media content items. At block 408, the example method 400 can select one or more media content items, from at least some of the plurality of subsets of media content items, that satisfy specified ranking criteria. The one or more media content items can be selected to be included in the set of media content items.

Figure 5:
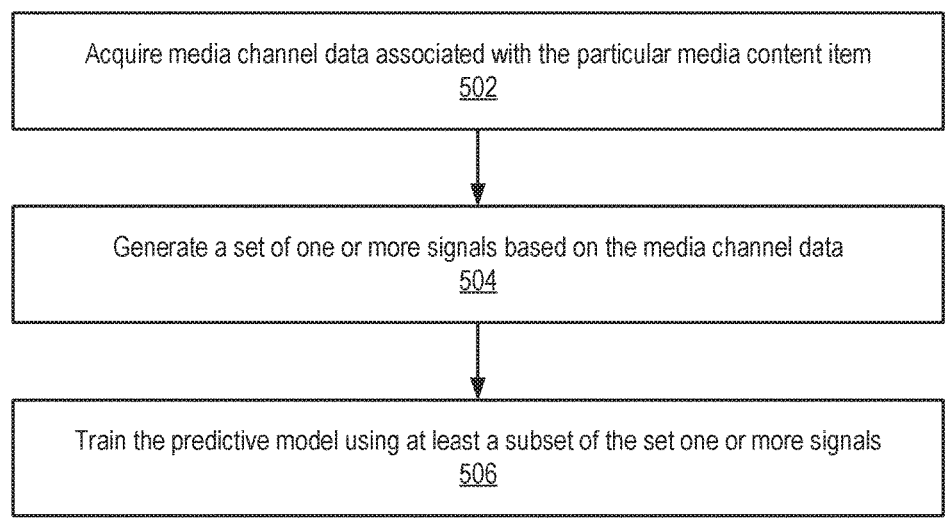
FIG. 5 illustrates an example method associated with ranking and providing related media content based on signals, according to an embodiment of the present disclosure.

FIG. 5 illustrates an example method 500 associated with ranking and providing related media content based on signals, according to an embodiment of the present disclosure. As discussed, it should be understood that there can be additional, fewer, or alternative steps performed in similar or alternative orders, or in parallel, within the scope of the various embodiments unless otherwise stated.

At block 502, the example method 500 can acquire media channel data associated with the particular media content item. At block 504, the example method 500 can generate a set of one or more signals based on the media channel data. At block 506, the example method 500 can train the predictive model using at least a subset of the set one or more signals.

It is contemplated that there can be many other uses, applications, features, possibilities, and/or variations associated with various embodiments of the present disclosure. For example, users can, in some cases, choose whether or not to opt-in to utilize the disclosed technology. The disclosed technology can, for instance, also ensure that various privacy settings, preferences, and configurations are maintained and can prevent private information from being divulged. In another example, various embodiments of the present disclosure can learn, improve, and/or be refined over time.

Social Networking System—Example Implementation

Figure 6:
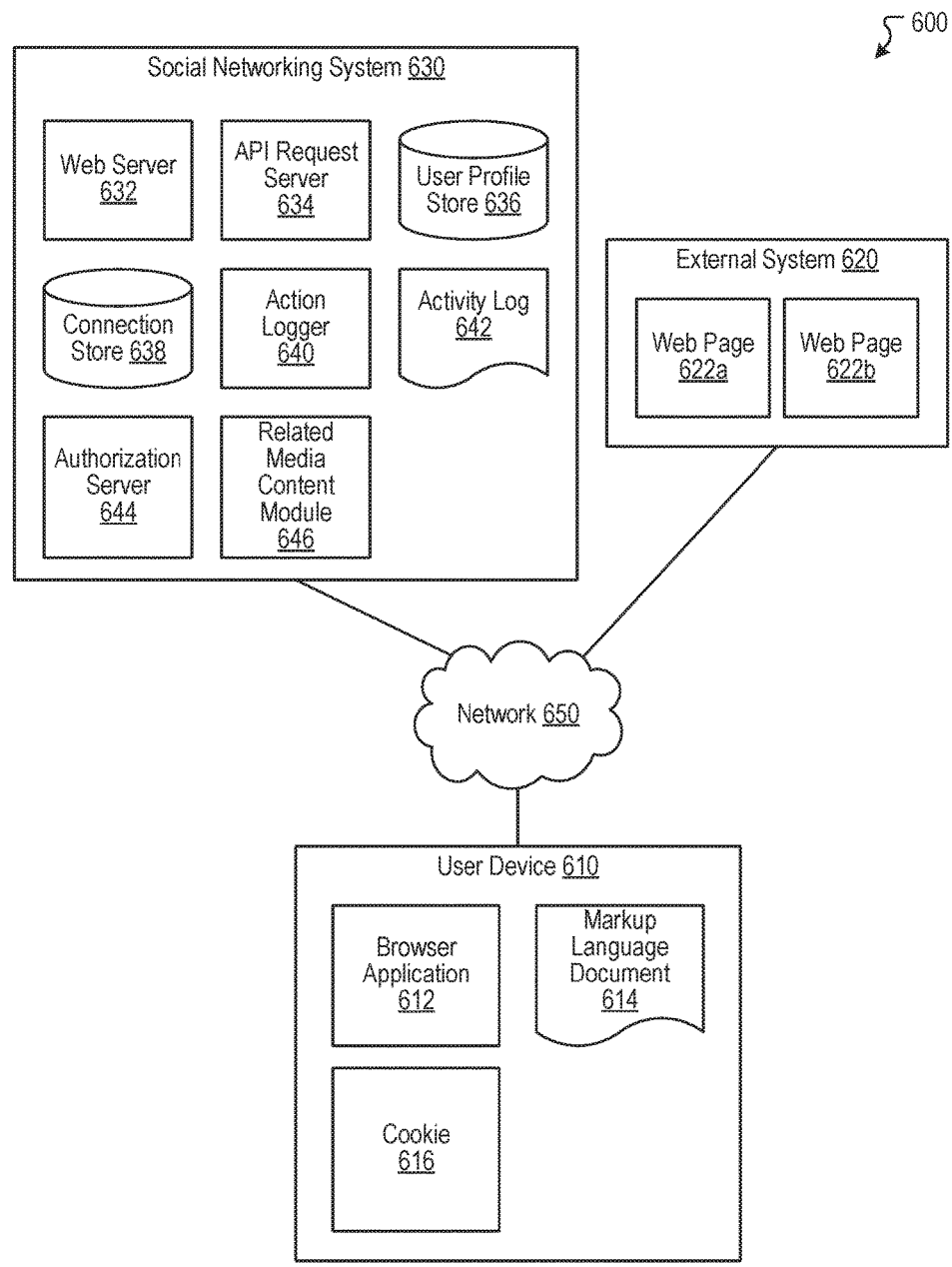
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet. In some embodiments, the social networking system 630 can include or correspond to a social media system (or service).

The user device 610 comprises one or more computing devices (or systems) that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11 (e.g., Wi-Fi), worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a related media content module 646. The related media content module 646 can, for example, be implemented as the related media content module 102 of FIG. 1. As discussed previously, it should be appreciated that there can be many variations or other possibilities associated with the disclosed technology. For example, in some instances, the related media content module (or at least a portion thereof) can be included or implemented in the user device 610. Other features of the related media content module 646 are discussed herein in connection with the related media content module 102.

Hardware Implementation

Figure 7:
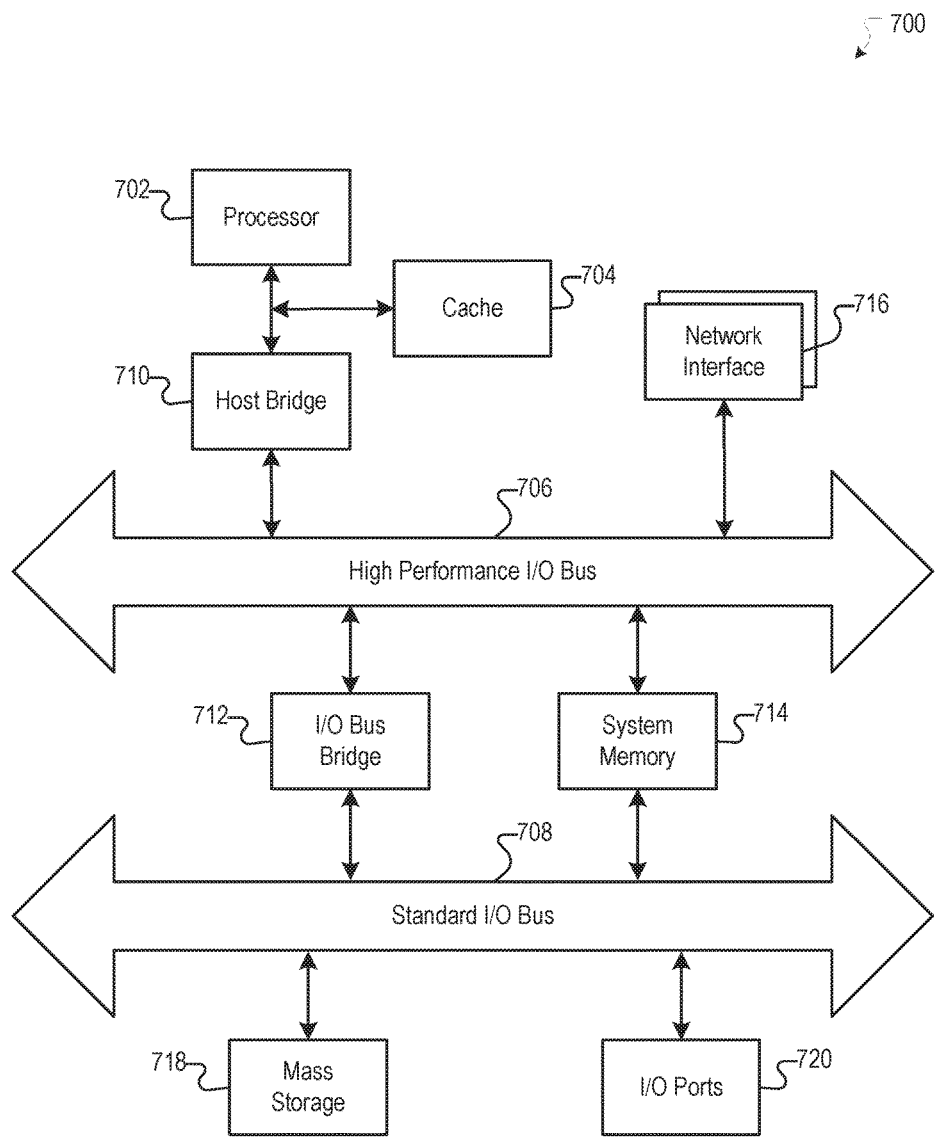
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments. Furthermore, reference in this specification to "based on" can mean "based, at least in part, on", "based on at least a portion/part of", "at least a portion/part of which is based on", and/or any combination thereof.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   detecting, by a computing system, a trigger to generate a set of media content items associated with at least one of a particular media content item associated with a media channel or a user viewing the particular media content item;

utilizing, by the computing system, a plurality of content generators to generate a plurality of subsets of media content items, wherein each of the plurality of content generators identifies a respective subset out of the plurality of subsets of media content items based on at least one of information associated with the particular media content item or information associated with the user viewing the particular media content item;

ranking, by the computing system, based on respective information associated with each media content item, at least some media content items in at least some of the plurality of subsets of media content items, wherein the ranking comprises developing a predictive model, based on machine learning, to facilitate ranking the at least some media content items based on media channel data associated with the media channel;

selecting, by the computing system, one or more media content items, from at least some of the plurality of subsets of media content items, that satisfy specified ranking criteria, the one or more media content items being selected to be included in the set of media content items; and presenting, by the computing system, the set of media content items in response to the detected trigger.

2. The computer-implemented method of claim 1, wherein developing the predictive model further comprises:
acquiring the media channel data associated with the particular media content item;
generating a set of one or more signals based on the media channel data; and
training the predictive model using at least a subset of the set one or more signals.

3. The computer-implemented method of claim 2, wherein ranking the at least some media content items further comprises:
predicting, based on the predictive model, one or more respective events for each of the at least some media content items:
combining the one or more respective events for each of the at least some media content items to produce a respective event metric for each of the at least some media content items; and
sorting the at least some media content items based on the respective event metric for each of the at least some media content items.

4. The computer-implemented method of claim 3, wherein the one or more respective events for each of the at least some media content items includes at least one of a like event, a share event, a comment event, or a view duration event.

5. The computer-implemented method of claim 1, wherein the plurality of content generators includes at least one of a behavioral similarity generator, a content similarity generator, a crowd sourcing generator, a same source generator, a user targeting generator, or a trending topic generator.

6. The computer-implemented method of claim 5, wherein the behavioral similarity generator utilizes collaborative filtering to identify a particular subset of media content items included in the plurality of subsets of media content items, and wherein the collaborative filtering is based on at least one of a like signal, a share signal, a comment signal, a view duration signal, or a mention signal.

7. The computer-implemented method of claim 5, wherein the content similarity generator identifies a particular subset of media content items included in the plurality of subsets of media content items, and wherein the particular subset of media content items is identified by the content similarity generator based on at least one of a mention signal, a text signal, a tag signal, a topic classification signal, or an image classification signal.

8. The computer-implemented method of claim 5, wherein the user targeting generator identifies a particular subset of media content items included in the plurality of subsets of media content items, wherein the particular subset of media content items is identified by the user targeting generator based on the information associated with the user, and wherein the information associated with the user includes at least one of user usage pattern data, user viewing history data, or user demographic data.

9. The computer-implemented method of claim 1, wherein the set of media content items includes a set of one or more videos, and wherein the particular media content item includes a particular video within a particular video channel.

10. A system comprising:
at least one processor; and
a memory storing instructions that, when executed by the at least one processor, cause the system to perform:
detecting a trigger to generate a set of media content items associated with at least one of a particular media content item associated with a media channel or a user viewing the particular media content item;
utilizing a plurality of content generators to generate a plurality of subsets of media content items, wherein each of the plurality of content generators identifies a respective subset out of the plurality of subsets of media content items based on at least one of information associated with the particular media content item or information associated with the user viewing the particular media content item;
ranking, based on respective information associated with each media content item, at least some media content items in at least some of the plurality of subsets of media content items, wherein the ranking comprises developing a predictive model, based on machine learning, to facilitate ranking the at least some media content items based on media channel data associated with the media channel;
selecting one or more media content items, from at least some of the plurality of subsets of media content items, that satisfy specified ranking criteria, the one or more media content items being selected to be included in the set of media content items; and
presenting the set of media content items in response to the detected trigger.

11. The system of claim 10, wherein developing the predictive model further comprises:
acquiring the media channel data associated with the particular media content item;
generating a set of one or more signals based on the media channel data; and
training the predictive model using at least a subset of the set one or more signals.

12. The system of claim 10, wherein the plurality of content generators includes at least one of a behavioral similarity generator, a content similarity generator, a crowd sourcing generator, a same source generator, a user targeting generator, or a trending topic generator.

13. The system of claim 10, wherein the set of media content items includes a set of one or more videos, and wherein the particular media content item includes a particular video within a particular video channel.

14. A non-transitory computer-readable storage medium including instructions that, when executed by at least one processor of a computing system, cause the computing system to perform a method comprising:
- detecting a trigger to generate a set of media content items associated with at least one of a particular media content item associated with a media channel or a user viewing the particular media content item;
- utilizing a plurality of content generators to generate a plurality of subsets of media content items, wherein each of the plurality of content generators identifies a respective subset out of the plurality of subsets of media content items based on at least one of information associated with the particular media content item or information associated with the user viewing the particular media content item;
- ranking, based on respective information associated with each media content item, at least some media content items in at least some of the plurality of subsets of media content items, wherein the ranking comprises developing a predictive model, based on machine learning, to facilitate ranking the at least some media content items based on media channel data associated with the media channel;
- selecting one or more media content items, from at least some of the plurality of subsets of media content items, that satisfy specified ranking criteria, the one or more media content items being selected to be included in the set of media content items; and
- presenting the set of media content items in response to the detected trigger.

15. The non-transitory computer-readable storage medium of claim 14, wherein developing the predictive model further comprises:
- acquiring the media channel data associated with the particular media content item;
- generating a set of one or more signals based on the media channel data; and
- training the predictive model using at least a subset of the set one or more signals.

16. The non-transitory computer-readable storage medium of claim 14, wherein the plurality of content generators includes at least one of a behavioral similarity generator, a content similarity generator, a crowd sourcing generator, a same source generator, a user targeting generator, or a trending topic generator.

17. The non-transitory computer-readable storage medium of claim 14, wherein the set of media content items includes a set of one or more videos, and wherein the particular media content item includes a particular video within a particular video channel.

* * * * *